Figure 10:
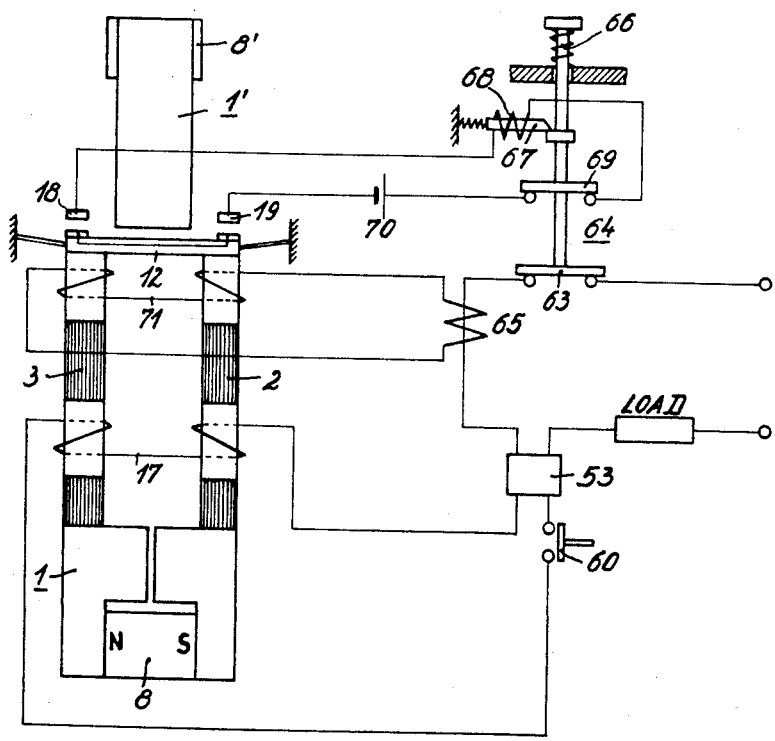

March 5, 1957     P. DUFFING     2,784,352
ALTERNATING-CURRENT CONTROL APPARATUS WITH HOLDING MAGNETS
Filed Feb. 20, 1953     3 Sheets-Sheet 1
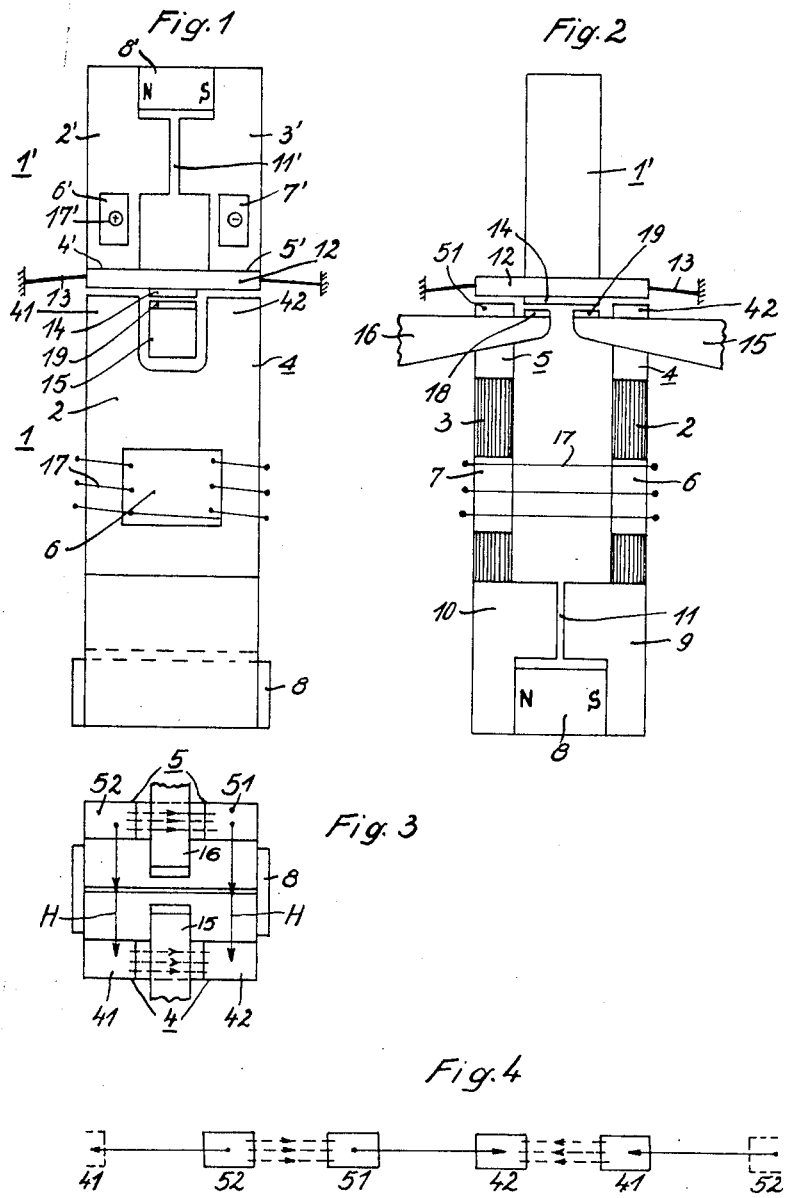
Inventor:
Paul Duffing

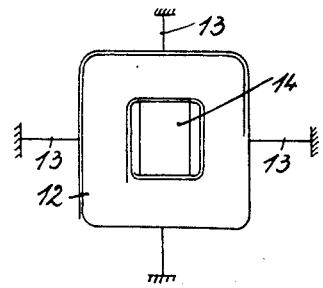
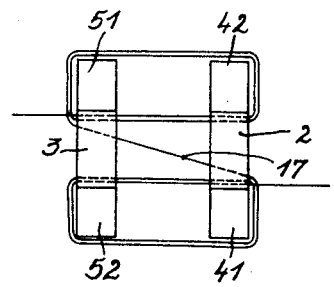
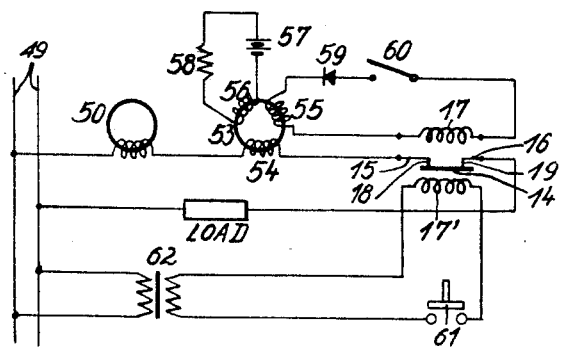
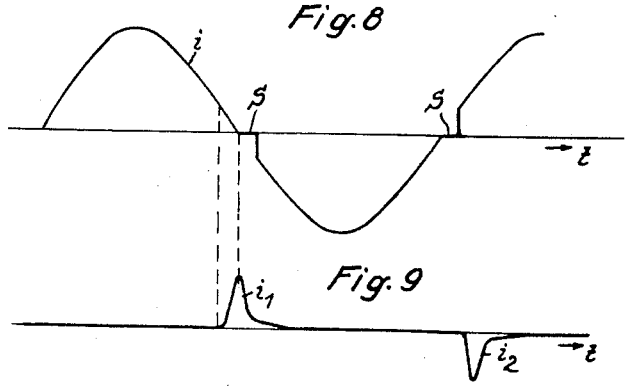

United States Patent Office 2,784,352
Patented Mar. 5, 1957

2,784,352

ALTERNATING-CURRENT CONTROL APPARATUS WITH HOLDING MAGNETS

Paul Duffing, Berlin-Siemensstadt, Germany, assignor to Siemens - Schuckertwerke Aktiengesellschaft, Berlin-Siemensstadt, Germany, a corporation of Germany Application February 20, 1953, Serial No. 338,088

Claims priority, application Germany February 26, 1952

10 Claims. (Cl. 317—11)

My invention relates to electromagnetic control apparatus for alternating current, particularly for application in power-consuming, generating or translating circuits.

Electromagnetic control apparatus have become known in which an armature is retained against a spring bias by a holding magnet whose flux is produced by permanent magnetism or by direct-current excitation. The holding magnet has a pulse-responsive release control winding which, when excited from a pulse transmitter, weakens the holding flux so that the armature is torn off the magnet by the force of the biasing spring. The control winding may be linked with the field structure of the holding magnet in opposed relation to the unidirectional holding flux so that the resultant flux is reduced by the excitation of the control winding, or the control winding may operate to shunt the unidirectional holding flux away from the armature. The control winding receives a pulse of excitation at a given time point of the half-wave period of the alternating current to be interrupted. The armature, when moving away from the magnet under the force of the biasing spring, may electrically release a circuit breaker in the circuit to be interrupted, or the armature may form part of the breaker.

In such a control device, the holding magnet functions to release the circuit breaker at a predetermined instantaneous value of the current to be interrupted. In many cases the release is supposed to occur at a moment so selected that the contacts of the breaker open at or near the current zero passage to obtain a current interruption as free as possible from arcing. For improving the switching conditions, a saturable reactor (switching reactor) may be inserted into the alternating-current circuit to be interrupted. Such a reactor flattens the current wave to a stepped shape during an interval of time (step interval) near the zero passages so that the breaker may open during that interval without danger of arcing. Since, under these operating conditions the breaker would be damaged if it were ever permitted to open at a time outside the step interval, care must be taken to have the pulse for the release control winding always occur at the correct moment. However, it may happen that, for instance, due to a fault in the pulse transmitter, the releasing pulse is issued at a wrong time, thus causing destruction of the breaker. Furthermore, it may be intended that the releasing signal, though issuing at the correct moment, be made ineffective or suppressed if other conditions for proper circuit interruption are not satisfied. For instance, it may be desired to have the releasing pulse become effective only if, at the same time, the voltage in the circuit to be interrupted has declined to a sufficient value, this being similar to requirements for remote protection systems; or it may be desired to have the circuit breaker disconnect a motor in response to a releasing pulse only when the motor is at standstill.

It is an object of my invention to devise electromagnetic control apparatus generally of the above-mentioned type that are capable of satisfying any such desiderata or requirements. More specifically, my invention aims at providing a control apparatus that causes the interruption of an alternating-current circuit in response to a releasing signal only when the signal pulse occurs in a proper relation to predetermined other operating conditions such as a given time relation of the pulse moment to the current zero passage or a given relation to the voltage or other condition of the load circuit to be controlled.

Another object of my invention is to improve in such electromagnetic control apparatus the holding force and the contact pressure so as to permit increasing the current-carrying duty for a device of a given size, or decreasing the size of the device needed for a given current loading.

According to my invention, the field structure of a holding magnet in an electromagnetic control apparatus generally of the above-mentioned kind is equipped with an additional control circuit which is traversed by a periodically-variable current, for instance, by the alternating current to be interrupted, and which is inductively linked with the field structure in aiding relation to the unidirectional holding flux so as to supplement a periodically-variable additional holding force. In such a device, the resultant holding force imposed upon the attracted armature is sufficiently overcome by the effect of the release control winding only if the releasing pulse occurs at a moment when the additional holding force has a low instantaneous value. That is, if the releasing pulse issues at a moment when the additional holding force is stronger than a given minimum, the pulse remains ineffective and the armature is not released for movement.

According to another feature of the invention, the pole shoes of the magnetic field system to be contacted by the armature are each split into two portions that are spaced from each other transverse to the direction of the unidirectional holding flux. The above-mentioned additional circuit is inductively linked with the split portions of the pole shoes, preferably by passing a conductor or winding through the gap between the two portions of each pole shoe.

The current flowing through the additional holding-force circuit may be chosen in accordance with the desired action. For instance, when the releasing pulse occurs at, or shortly prior to, the current zero passage and the switch is to open within the above-mentioned step interval produced by the switching reactor, this current is preferably identical with, or proportional to, the alternating load current to be interrupted. This has the result that at the moment when the instantaneous value of the current in the holding circuit exceeds a given magnitude, the armature is retained by the additional holding flux even if a releasing pulse should issue at this moment. Only if the releasing pulse is issued at a moment when the wave of the load current approaches the zero value or passes through zero, can the armature drop off. If, for instance, and as mentioned above, a circuit breaker is to be released only when a motor in the circuit to be interrupted is at standstill, then the additional holding-force circuit may be excited, for instance, by a direct current whose magnitude depends upon the motor speed. An alternating current may also be used for this purpose, provided its phase position is so chosen that the current has a finite and sufficient instantaneous value at the zero moment of the load current.

If the releasing signal is to occur near or at the zero passage of the load current, then the circuit breaker must be as free as possible of inertia so that it immediately effects the circuit interruption when receiving the pulse. However, the invention may also be applied with circuit breakers released by a holding magnet which do not satisfy this condition but have such a large inertia that the releasing signal must be given sufficiently ahead of the current zero moment to have the breaker contacts separated shortly before the zero passage a distance sufficient for extinction of the arc at the zero moment. In such cases, the alternating current flowing through the additional winding must be given a phase lead relative to the contact current so that a faulty pulse occurring at the current zero moment does not cause a release, while a pulse occurring at the correct moment will release the breaker.

According to still another feature of the invention, the field structure of the holding magnet itself is part of the circuit breaker, and the pole shoes are so dimensioned that they are not saturated by the unidirectional holding flux, while the current flowing through the additional winding is either the alternating load current to be interrupted or is an alternating current proportional to the load current. This has the further advantage that the additional holding force produces an additional contact pressure which depends upon the instantaneous value of the load current to be interrupted. That is, the additional contact pressure increases and decreases in accordance with the increase and decrease of the instantaneous current values. This has the following result. For a given current magnitude, a given minimum contact pressure is usually required. If this contact pressure is produced only by the unidirectional holding flux, then this holding flux must be given a correspondingly large magnitude. This in turn calls for a correspondingly large energy requirement to be satisfied by the signal pulse transmitter. However, if according to the just-mentioned feature of the invention the holding force produced by the holding magnet is supplemented by an additional holding force dependent upon the current to be interrupted, then the contact pressure increases with any increase in current, thus making it possible to use the same circuit breaker with the same unidirectional holding flux for a larger current-carrying duty without increasing the power rating and constructional requirements for the pertaining control devices.

The foregoing and other objects, advantages and features of the invention will be apparent from the following description of the embodiments illustrated on the drawing, in which—

Fig. 1 shows a front view of an electromagnetic control device according to the invention, Fig. 2 shows a part-sectional side view of the same device, the sectional plane extending through the vertical center axis in Fig. 1, Fig. 3 shows a top view of the field structure of the same device, the armature and all parts above the armature being removed, Fig. 4 is a diagrammatic and linearly-developed representation of the magnetic flux path extending through the pole shoes of the field structure shown in Fig. 3 when the device is in operative condition.

Fig. 5 shows schematically an embodiment of an armature assembly applicable in devices according to Figs. 1 to 3.

Fig. 6 shows diagrammatically a control winding also pertaining to the device according to Figs. 1 to 3, Fig. 7 is a circuit diagram applicable for the control device according to the preceding figures, Figs. 8 and 9 are coordinate diagrams explanatory of the operation of the device, and Fig. 10 shows another circuit diagram in conjunction with a modified control device for releasing a separate circuit breaker.

The control device, as shown in Figs. 1 to 3, has a magnetic field structure 1 designed as a holding magnet. The structure has two laminated legs 2 and 3 with respective pole shoe portions 4 and 5 (Fig. 3). Each leg has an opening 6 or 7. The field structure comprises a permanent magnet 8 inserted between core portions 9 and 10 which form an air gap 11 between each other and are joined with respective legs 2 and 3. An armature 12 is mounted on leaf springs 13 and carries an electric bridging contact 14 which, for instance, may be cemented to the armature. The pole shoe portions 4 and 5 are each split into two partial poles 41, 42 and 51, 52. Two current buses 15 and 16 enter through the gaps between each pair of partial poles and carry respective stationary contacts 18 and 19 for coaction with the movable bridging contact 14. The current buses 15 and 16 are stationarily mounted in fixed relation to the magnetic field system. A pulse-responsive release control winding 17 is mounted on the field structure and passes through the openings 6 and 7.

The permanent magnet 8 produces a unidirectional magnetic flux which holds the armature 12 continuously against the pole faces of field structure 1 when the movable contact 14 is in engagement with the stationary contacts 18, 19 and the control winding 17 is not excited. When winding 17 receives an exciting pulse, it produces in the field system a flux which, if sufficiently strong, shunts the permanent flux away from the armature 12. That is, the flux of magnet 8 then passes mainly through the gap 11 of the shunt path formed by core pieces 9 and 10 so that the holding force previously effective on the armature is weakened. As a result, the springs 13 now tear the armature away from the field system. Near the end of its upward swing, the armature comes into the field range of a second holding magnet 1' which then retains the armature in the position shown in Figs. 1 and 2.

The holding magnet 1' has two legs 2', 3' with respective pole shoes 4', 5' and respective openings 6', 7'. A release control winding 17' passes through openings 6' and 7'. Holding magnet 1' further comprises a permanent magnet 8' and a magnetic shunt path interrupted by an air gap 11'. When the winding 17' is excited, the permanent holding flux from magnet 8' is shunted away from the armature 12 and passes mainly through the air gap 11', thus permitting the springs 13 to swing the armature downward into the field range of the magnet structure 1 which then retains the armature in the circuit-closing position until winding 17 is excited by another releasing pulse.

When armature 12 is attracted by holding magnet 1 so that the circuit of buses 15 and 16 is closed, the current then passing through the buses produces an additional magnetic flux in the field structure of magnet 1 with the effect of imposing an additional holding force upon the armature.

In Fig. 3, the unidirectional holding flux produced by the permanent magnet 8 is represented by vertical solid arrow lines H. This main holding flux passes from partial pole 52 to partial pole 41, and from partial pole 51 to partial pole 42. The additional holding flux caused by the current flowing through buses 15 and 16 is represented by horizontal broken arrow lines. For a given instantaneous current value, this additional holding flux, as shown, passes from partial pole 52 to partial pole 51, and from partial pole 41 to partial pole 42.

Fig. 4, showing the pole faces of the partial poles developed along a straight line, indicates the unidirectional holding flux by full lines and the variable additional holding flux by broken lines for the same current conditions as assumed in Fig. 3. As apparent from Fig. 4, the additional alternating holding flux increases the total flux in pole shoe 52. In pole shoe 51, the total holdign flux, at the moment under observation, is at first weakened by the alternating bus current. Assume that the bus current, at that moment, is increasing from its zero value in the positive direction, then this current will pass through an instantaneous value where the alternating flux just balances the constant flux, and thereafter the alternating flux will be preponderant so that the resultant holding flux in partial pole 51 increases in the reversed direction. Corresponding conditions apply to the partial poles 42 and 41. During negative current half waves, that is when the bus current flows in the opposite direction, the flux in partial pole 51 is always increased, while in partial pole 52 the flux is first weakened and thereafter increased in the opposite sense as soon as the bus current exceeds a given instantaneous value. Corresponding conditions obtain in partial pole shoes 41 and 42.

Consequently, the additional flux due to current passing through the buses 15 and 16 always produces an additional holding force at one of partial poles 41, 42 and at one of partial poles 51, 52. This force is not affected by the pulse-responsive release control winding 17. Hence, when due to excitation of the pulse-responsive winding 17 the unidirectional holding flux from permanent magnet 3 is shunted away from the armature, then the additional holding flux remains nevertheless effective to keep the armature attracted as long as this additional holding flux does not drop below a critical magnitude. Therefore, if the armature is to be released, for instance, at the zero moment of the alternating current, and if the additional holding flux is made dependent upon the current to be interrupted by passing this current through the buses 15 and 16, then the armature will remain attracted if, due to a fault in the pulse transmitter, the release control winding 17 receives excitation at a moment departing from that of the current zero passage. However, if the pulse is transmitted to the release control winding 17 shortly prior to or at the moment of the current zero passage, then the permanent holding flux is diverted from the armature, and since, under these conditions, the additional holding flux has also declined sufficiently, the armature can now drop off and break the circuit of buses 15 and 16.

It is preferable to give the portions of legs 2 and 3 located above openings 6, 7 and including the partial poles such a dimensioning that they are not saturated by the unidirectional holding flux. Then the magnetic holding force is dependent upon the instantaneous value of the current so that the contact pressure between bridging contact 14 and stationary contacts 18, 19 increases with an increase in current, thus making the device applicable for higher current capacities as explained in the foregoing.

The portions of legs 2 and 3 on both sides of openings 6 and 7 are preferably dimensioned to become saturated by the unidirectional holding flux so that a small current in the pulse-responsive release control winding 17 suffices to produce an effective diversion of the unidirectional holding flux from the armature.

The armature 12 is preferably laminated to minimize eddy current losses. The armature may be wound of a thin iron strip, for instance, in ring shape. In the illustrated embodiment, and as apparent from Fig. 5, the armature core consists of a wound-up iron strip and has a substantially square shape with a substantially square center hole in which the bridging contact 14 is located. The contact 14 may be joined with the laminated armature structure 12, for instance, by an adhesive.

Fig. 6 illustrates how the release control winding 17 is wound onto the two legs 2 and 3 of the field structure. For lucidity, only two turns on each leg are illustrated and placed side by side, while in reality a larger number of turns are placed above one another.

For performing the above-described operation, the illustrated control device may be connected into a load circuit as exemplified by Fig. 7. The load circuit according to Fig. 7 is energized from an alternating-current line 49 and is equipped with a saturable series reactor 50 which flattens the current wave in the above-mentioned manner during short intervals of time within which the control device is to open the load circuit. The illustration shows only some of the parts of the above-described control device. These parts, denoted by 14 to 19 are identical with the correspondingly denoted parts in Figs. 1 to 6. Also connected in the load circuit is a winding 54 of a pulse transmitter 53 for supplying a control signal to the release control winding 17 of the circuit control device. The pulse transmitter 53 is essentially a transformer so dimensioned that it is saturated by the current in winding 54 almost during the entire half-wave period of the alternating load current. The saturable transformer has a secondary pulse-issuing winding 55 and a premagnetizing winding 56. Winding 56 is energized by a direct current source 57 through a resistor 58. The release control winding 17 is connected with winding 55 through a valve 59 and a control switch 60. The second release control winding 17′ of the control device may be connected to another pulse transmitter energized from the line. Since winding 17′ controls only the closing of the load circuit, it may suffice to energize it from the line simply under control by a push-button contact 61, preferably through a transformer 62 with or without a rectifier.

The operation of the circuits will now be explained with reference to the current-time diagrams shown in Figs. 8 and 9.

Fig. 8 shows the wave of the load current $i$. Each half wave includes a step $s$ caused by the switching reactor 50 during which the instantaneous current value is zero or sufficiently close to zero to permit opening of the contacts without arcing.

Fig. 9 denotes the time characteristic of the releasing current pulses $i_1$ issued by pulse winding 55 to control winding 17 when switch 60 is closed. The direct current premagnetization imposed by winding 56 upon the pulse transmitter 53 has the effect that the pulse $i_1$ commences ahead of the current step $s$ when the alternating current $i$, declining from its positive maximum, approaches the zero value. As a result, pulse $i_1$ in control winding 17 reaches at the starting moment of step $s$ an amplitude sufficient for releasing the armature with contact 14 from the holding magnet, thus interrupting the load circuit within the step interval $s$. Aside from the positive pulse $i_1$, the pulse transmitter also issues a negative pulse $i_2$ occurring after the next following current zero passage as soon as the current again assumes positive instantaneous values. However, the valve 59 prevents the negative pulse $i_2$ from effecting a release of the control device.

Normally, the contacts 14, 18, 19 are closed and the control switch 60 is open so that the pulse transmitter 53 remains ineffective. For opening the load circuit, the switch 60 is closed. The next following positive pulse $i_1$ issuing from winding 55 of the pulse transmitter 53 then passes through valve 59 and excites the release control winding 17. This causes the constant holding flux to be shunted away from the armature as described in the foregoing, so that the armature with movable contact 14 is torn away from the stationary contacts 18, 19 to interrupt the load current. Thereafter, the armature is retained by the second holding magnet 1′ (Figs. 1, 2) until a releasing pulse is supplied to the winding 17′ by actuating the switch 61 (Fig. 3). The armature then moves back into the circuit-closing position.

When the load circuit is closed by the movable contact 14 and winding 17 receives a pulse which, due to a fault in the pulse transmitter, occurs at a wrong moment, for instance when the load current has its maximum amplitude, the pulse remains ineffective because the armature is then retained by the additional holding flux produced by the current then flowing through the contact buses 15, 16 and the bridging contact 14. Faulty releases, therefore, are safely prevented.

If the closing of the contacts is to occur in a predetermined phase relation to the wave period of the voltage or current of the supply line, then the pulse transmitter for control winding 17′ (of magnet 1′ in Figs. 1, 2) may be given a design similar to that of transmitter 53 (Fig. 7), except that the transmitter is then to be energized by the line voltage. It will also be understood that the holding magnet 1′ for controlling the opening of the contacts may be given a design similar to that of the above-described holding magnet 1 if it is desired to have the circuit-closing operation occur only when the closing signal issues at a moment at which the current in the additional control circuit of the magnet system satisfies a predetermined condition. Devices according to the invention are also applicable for periodic operation in response to opening and closing signals recurring synchronously with the wave period of the alternating current.

While in the illustrated embodiment the control device forms also the breaker for interrupting the circuit under control, the device may also be applied in connection with a separate load control means, such as a contactor or breaker, which is released by the drop-off movement of the armature. A circuit diagram of such a combination is schematically shown in Fig. 10.

With the exception of the modifications described in the following, the control device shown in Fig. 10 is similar to that of the preceding figures, the same reference numerals being used for denoting respectively similar structural and circuit elements.

The load circuit according to Fig. 10 is controlled by a normally closed contact 63 of a circuit breaker 64 and contains a current transformer 65 or the like device for providing a control current proportional to the alternating load current and in synchronism therewith. A signal pulse transmitter 53, which may be similar to transmitter 53 in Fig. 7, is also connected with the load circuit. The circuit breaker 64 is biased by a kick-out spring 66 but is normally held in closed position by a spring-biased latch 67 which is released when a coil 68 is energized. A normally closed interlock contact 69 of breaker 64 is connected with coil 68 in series with a suitable current source 70 and under control by the contacts 18, 19 and the armature 12 of the control device.

The armature 12 of the control device is normally kept attracted by the holding magnet 1 and is released when the pertaining release control winding 17 is energized from the pulse transmitter 53 under control by a switch or relay 60. The additional control circuit 71 of the device is connected to the current transformer 65 to be energized by alternating current proportional to the load current. The additional circuit 71 may either have a conductor passing through the gap between the above-described partial poles of each leg 2 and 3 of the holding magnet or, as shown in Fig. 10, this circuit may have windings placed around the partial poles.

The operation of the device in the circuit of Fig. 10 is essentially as described in the foregoing except that the drop-off movement of the armature 12 closes the control circuit of coil 67 to release the separate circuit breaker 64.

It will be obvious to those skilled in the art upon a study of this disclosure that my invention permits of various modifications and may be embodied in apparatus other than specifically illustrated and described, without departing from the essential features of the invention and within the scope of the claims annexed hereto.

I claim:

1. Electromagnetic control apparatus for alternating current, comprising a magnetic field structure and an armature in the field of said structure, said armature being movable toward said structure and having a bias away from said structure, said structure having magnet means for producing a unidirectional holding force to retain said armature when said armature has moved to said structure, an alternating-current load circuit having circuit control means connected with said armature for controlling said load circuit in dependence upon movement of said armature, a control winding and a control circuit connecting said control winding to said load circuit, switching means in said control circuit for closing and opening said control circuit independently of said load circuit, said control winding being disposed on said structure for weakening said holding force in phase dependence upon the current of said load circuit when said control circuit is closed by said switching means, and variable-current circuit means inductively linked with said structure in aiding relation to said magnet means for imposing a variable additional holding force upon said armature, whereby said armature is released when said control winding is energized and said variable-current circuit means has simultaneously a given current condition.

2. Electromagnetic control apparatus for alternating current, comprising a magnetic field structure and an armature in the field of said structure, said armature being movable toward said structure and having a bias away from said structure, said structure having constant-flux magnet means to produce a unidirectional holding force for retaining said armature when said armature has moved to said structure, an alternating-current load circuit, circuit control means disposed in said load circuit and connected with said armature for controlling said load circuit in dependence upon movement of said armature, a control circuit having a pulse-responsive control winding disposed on said structure for temporarily weakening said unidirectional holding force to an armature-releasing magnitude, switch means in said control circuit for closing and opening said control circuit, and a phase-responsive pulse transmitter primarily connected to said load circuit and secondarily connected to said control circuit for supplying said winding, when said control circuit is closed by said switch means, with an excitation pulse near the zero passages of the current in said load circuit, said load circuit having a portion inductively linked with said structure in aiding relation to said constant-flux magnet means for imposing a variable additional holding force upon said armature, whereby said armature is released to move to said circuit-opening position when said control winding is excited and the alternating current in said load circuit passes simultaneously through a given instantaneous magnitude.

3. Electromagnetic control apparatus for alternating current, comprising an alternating-current load circuit having contact means for opening and closing said load circuit, a magnetic field structure, an armature disposed in the field of said structure and connected with said contact means for controlling said contact means, said armature being attractable by said structure to circuit-closing position and having a spring bias away from said structure to circuit-opening position, said structure having magnet means to produce a unidirectional holding force for retaining said armature in circuit-closing position, a control circuit connected with said load circuit and comprising a control winding and switch means for opening and closing said control circuit, said control winding being disposed on said structure for weakening said holding force in phase dependence upon the current of said load circuit when said switch means is closed, and said load circuit having a portion inductively linked with said structure in aiding relation to said magnet means for imposing a variable additional holding force upon said armature, whereby upon closing of said switch means said armature is released to move to said circuit-opening position when said control winding is excited and the alternating current in said load circuit passes simultaneously through a given instantaneous magnitude.

4. Electromagnetic control apparatus for alternating current, comprising a magnetic field structure and an armature in the field of said structure, said armature being movable toward said structure and having a bias away from said structure, said structure having magnet means for producing a unidirectional holding force to retain said armature when said armature has moved to said structure, said armature having contact means actuable by armature movement, an alternating-current load circuit to be controlled, circuit control means disposed in said load circuit and having a circuit connected with said contact means for controlling said load circuit in response to said movement, a control winding and a control circuit connecting said control winding to said load circuit, switch means for closing and opening said control circuit, said control winding being disposed on said structure for weakening said holding force in phase dependence upon the current of said load circuit when said switch means is closed, an additional circuit inductively linked with said structure in aiding relation to said magnet means for imposing a variable additional holding force upon said armature, said additional circuit being connected with said load circuit and having a current variable in accordance with the current in said load circuit, whereby said armature is released for operation of said circuit control means when said control winding is energized and said additional circuit has a given simultaneous current condition.

5. Electromagnetic control apparatus for alternating current, comprising a holding magnet having a generally U-shaped field structure and having two legs with respective aligned pole ends, an armature disposed in bridging relation to said pole ends and being movable toward said ends and biased away therefrom, said structure having magnet means for producing a holding force retaining said armature engaged with said pole ends, an alternating-current load circuit having circuit control means connected with said armature for controlling said load circuit in dependence upon movement of said armature, a control winding and a control circuit connecting said control winding to said load circuit, switch means for closing and opening said control circuit, said control winding being disposed on said structure away from said pole ends for weakening said holding force in phase dependence upon the current in said load circuit when said switch means is closed, each of said pole ends being subdivided into partial poles, and a variable-current circuit inductively linked with said partial poles for imposing a variable additional holding force upon said armature, whereby said armature is released when said control winding is energized and said variable-current circuit has simultaneously a given current condition.

6. In control apparatus according to claim 5, said partial poles of each pole end forming a gap between each other and said variable-current circuit having a conductor passing through said gaps.

7. In control apparatus according to claim 1, said field structure comprising a magnetic reluctance shunt across said magnet means, and said control winding being disposed on said structure at the shunt side away from said magnet means for diverting, when energized, the flux of said magnet means away from said armature through said shunt.

8. Electromagnetic control apparatus for alternating current, comprising a holding magnet having a generally U-shaped field structure and having two legs with respective aligned pole ends, an armature disposed in bridging relation to said pole ends and being movable toward said ends and biased away therefrom, said structure having magnet means for producing a holding force retaining said armature engaged with said pole ends, said magnet means having in said pole ends a magnetic flux below the saturation value of said pole ends, an alternating-current load circuit having circuit control means connected with said armature for controlling said load circuit in dependence upon movement of said armature, a control winding and a control circuit connecting said control winding to said load circuit, switch means for closing and opening said control circuit, said control winding being disposed on said structure away from said pole ends for weakening said holding force in phase dependence upon the current in said load circuit when said switch means is closed, and a variable-current circuit inductively linked with said pole ends for imposing a variable additional holding force upon said armature, whereby said armature is released when said control winding is energized and said variable-current circuit has simultaneously a given current condition.

9. In control apparatus according to claim 5, said field structure comprising a magnetic reluctance shunt across said magnet means and having between said partial poles and said shunt a restricted and magnetically saturated portion on which said control winding is located for diverting, when energized, the flux of said magnet means away from said armature through said shunt, and said partial poles being magnetically unsaturated.

10. In control apparatus according to claim 5, said partial poles of each pole end forming a gap between each other, and said variable-current circuit having two current-supply buses extending through said respective gaps and forming respective stationary contacts, and said armature having a bridging contact engageable with said stationary contacts.

References Cited in the file of this patent

UNITED STATES PATENTS

| 1,287,232 | Chubb | Dec. 10, 1918 |
| 1,671,471 | Fortesque | May 29, 1928 |
| 1,730,881 | Fortesque | Oct. 8, 1929 |
| 1,760,542 | Cohn | May 27, 1930 |
| 1,787,931 | Besold | Jan. 6, 1931 |
| 1,920,745 | Grunholz | Aug. 1, 1933 |
| 1,948,099 | Dickinson | Feb. 20, 1934 |
| 2,142,015 | Bedford | Dec. 27, 1938 |
| 2,610,231 | Wettstein | Sept. 9, 1952 |
| 2,619,628 | Kesselring | Nov. 25, 1952 |

FOREIGN PATENTS

| 304,691 | Germany | Apr. 2, 1918 |
| 517,083 | Germany | Jan. 31, 1931 |